United States Patent [19]

Hehl

[11] 4,020,633

[45] May 3, 1977

[54] PROGRAMMABLE HYDRAULIC POWER CONTROLS FOR INJECTION MOLDING MACHINES

[76] Inventor: Karl Hehl, Arthur-Hehl-Str. 32, 7298 Lossburg, Germany

[22] Filed: June 28, 1976

[21] Appl. No.: 700,112

[30] Foreign Application Priority Data

June 28, 1975 Germany .......................... 2528963

[52] U.S. Cl. .............................. 60/445; 60/DIG. 2; 60/DIG. 10

[51] Int. Cl.$^2$ ........................................ F16H 39/46

[58] Field of Search .............. 60/445, 494, DIG. 2, 60/DIG. 10, 477, 479

[56] References Cited

UNITED STATES PATENTS

| | | | |
|---|---|---|---|
| 2,241,556 | 5/1941 | MacMillin et al. | 60/DIG. 2 |
| 2,457,467 | 12/1948 | Hartman | 60/DIG. 2 |
| 3,579,987 | 5/1971 | Busse | 60/445 X |

Primary Examiner—Edgar W. Geoghegan
Attorney, Agent, or Firm—Joseph A. Geiger

[57] ABSTRACT

Programmable hydraulic power controls for an injection molding machine having a proportional-response flow control valve arranged in the main supply line of a variable delivery pump and a feedback line with a control diaphragm linking a point on the supply line behind the flow control valve with the pump control member, and a proportional-response pressure control valve in a branch line to the feedback line, each valve being controlled by a proportional-force electromagnet with a position transducer and electronic feedback loop for position verification in accordance with a nominal program signal fed to the electromagnet.

7 Claims, 3 Drawing Figures

PROGRAMMABLE HYDRAULIC POWER CONTROLS FOR INJECTION MOLDING MACHINES

BACKGROUND OF THE INVENTION

1. Field of the Invention The present invention relates to the hydraulic power controls of injection molding machines and, more particularly, to hydraulic power controls by means of which the quantity and pressure of the hydraulic fluid which is fed to the machine by a variable output pump are adjustable in accordance with a predetermined program of movement speed and torque or pressure, respectively.

2. Description of the Prior Art

Modern injection molding machines require hydraulic power for a number of separately powered drive units: the die closing unit drive, the plastification screw drive, the injection unit approach drive, the injection drive, the parts ejector drive, and the core removal drive. Each of these drives has specific requirements of movement force in the form of torque or pressure and movement speed, both changing in various ways in the course of each operational cycle of the machine.

For injection molding machines which are to be adjustable for different production setups, with different injection molding dies and different plastic raw materials to be injection molded, the various drive units need to be separately adjustable in terms of force and speed, in order to optimize the productivity and the power consumption of the machine. In the past, these hydraulic adjustability requirements have been fulfilled with only limited success, using conventional hydraulic control components, such as plunger type displacement valves, for the control of pressures and flow speeds, including digital, incrementally settable valves. The more recently suggested solutions, which feature so-called cartridge valves, are similarly handicapped by the fact that these valves, like the conventional plunger valves, are essentially of the open-and-shut type. For machines intended for high-quality production, it was therefore still necessary to provide a complex and costly hydraulic controls circuit with an electronic feedback loop and with all the necessary measuring and monitoring components.

In another prior art development, the suggestion is made to replace the feedback-adjusted hydraulic controls with pre-programmable electromagnetically adjustable pressure valves and flow control valves (Article by H. Rindt in Kunststoff-Journal, Volume 9, Apr. 4, 1975, pages 8–12: "Spritzgiessmachinen — programmierbar durch Proportionalventile"). This approach suggests the use of a continuously adjustable pressure control valve of the jet impact type, featuring a proportional-force electromagnet as the program input element. A two-way plunger valve, controlled by an auxiliary plunger and a cooperating proportional-force electromagnet, is used to adjust the flow speeds in both directions of movement, in accordance with a predetermined program which is imposed on the electromagnet.

It has now been found, as a result of extensive tests conducted with injection molding machines equipped with programmable electromagnetically adjusted valves, that the mere use of such valves in the hydraulic controls of the machine is still subject to certain operational shortcomings, and that additional requirements must be met, if the consumption of energy and the consumption of cooling liquid by the injection molding machine is to be reduced to the optimal minimum.

SUMMARY OF THE INVENTION

Underlying the present invention is the primary objective of improving upon the prior art programmable hydraulic power controls for injection molding machines in such a way that the values of power and speed which are required for the various drive units during each operating cycle of the machine can be followed with considerably improved accuracy, with no appreciable increase in the cost of the machine, and with the result that electric motors of lower power rating can be specified.

The present invention proposes to attain this objective by suggesting a hydraulic control circuit for injection molding machines in which the hydraulic pump cooperates with programmable proportional-response valves which continuously adjust the pressure and the quantity, i.e. the flow speed, at which hydraulic fluid is supplied to the machine, and where the main fluid supply line downstream of the proportional flow control valve is connected to a hydraulic feedback line which includes an adjustable control diaphragm and leads to the control member of the variable delivery pump, thereby forming a feedback loop for pump adjustments which compensate for fluid leakage and friction losses, and further, where the proportional-force electromagnets of the pressure control valve and of the flow control valve are both connected in an electronic feedback loop by means of which deviations of the actual valve positions are continuously monitored and automatically eliminated.

The suggested hydraulic control circuit produces an almost perfect adjustment of the pressure and flow values produced by the variable delivery pump to the nominal values which are fed into the control circuit in the form of electronic input signals. The preprogrammed nominal values determine pressure and flow speed for the entire operational cycle of the injection molding machine, at the exact levels required at all points of the cycle, for the creation and reliably accurate repetition of the forces and speeds which are optimal for each operational setup. The results reflect themselves in considerable economies of energy consumption, reduced cooling water use, and a reduction of the weight of the injection molding machine.

In a preferred embodiment of the invention, it is further suggested that the proportional-response pressure valve, the proportional-response flow valve, the hydraulic feedback line with its control diaphragm, and the feedback loops, including the lines interconnecting the various control components, be structurally integrated in the form of a single rigid control unit, and that this control unit, in turn, be so designed that it forms a rigid assembly with the variable delivery pump which, together with its electric drive motor, is elastically mounted in a vertical wall of the fluid reservoir, as part of the machine frame. This arrangement, in addition to its advantages of simplicity and savings in manufacturing costs, offers the operational advantage of greater accuracy of response, due to the absence of long connecting lines which are subject to expansion under pressure, thereby distorting the control functions.

BRIEF DESCRIPTION OF THE DRAWINGS

Further special features and advantages of the invention will become apparent from the description following below, when taken together with the accompanying drawing which illustrates, by way of example, a preferred embodiment of the invention, represented in the various figures as follows.

DESCRIPTION OF THE PREFERRED EMBODIMENT

Figure 1:
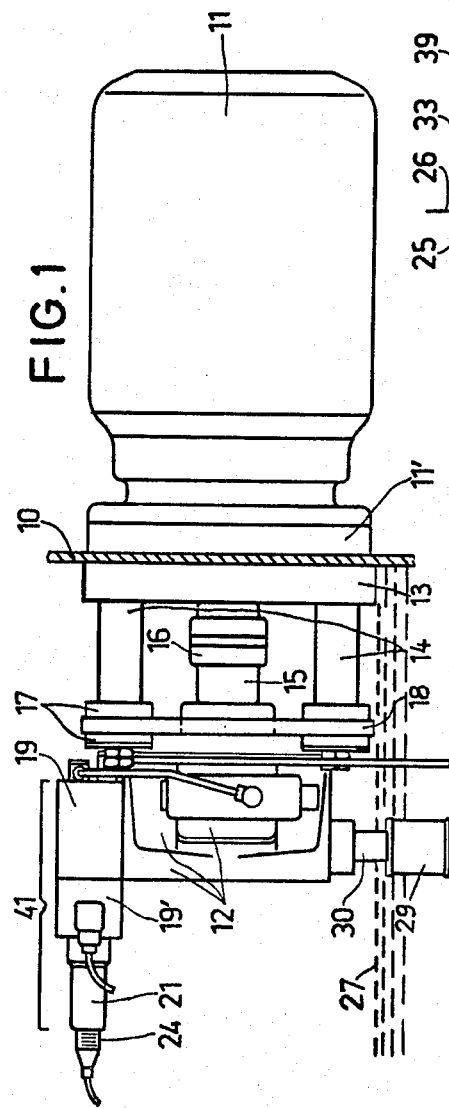
FIG. 1 shows in an elevational front view a hydraulic power unit with programmable hydraulic pressure and flow controls embodying the present invention.
Figure 2:
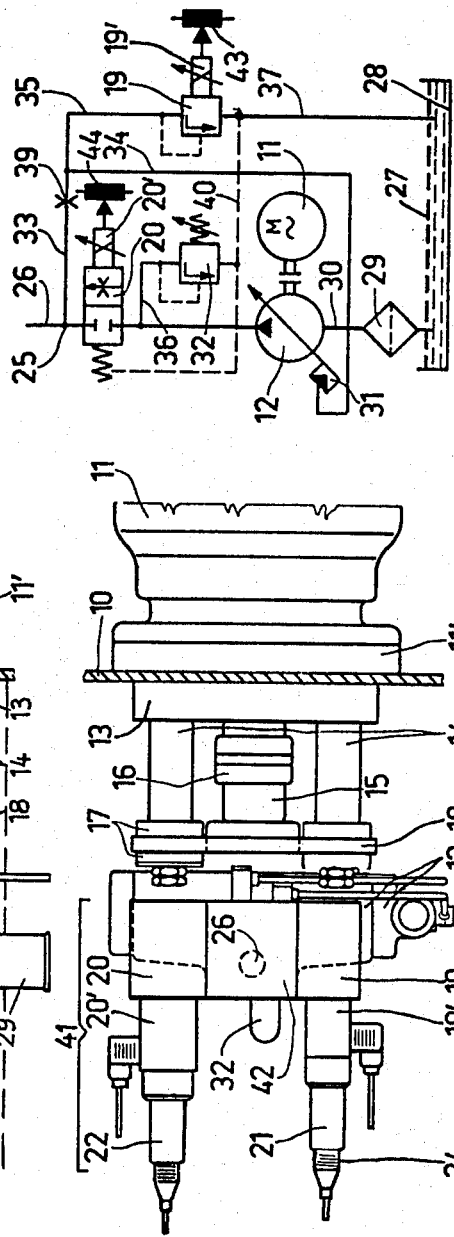
FIG. 2 shows the device of FIG. 1 in a plan view.

Referring to FIGS. 1 and 2 of the drawing, there can be seen a hydraulic power unit for an injection molding machine, the unit consisting essentially of an electric motor 11, a variable delivery hydraulic pump 12, and a hydraulic control unit generally designated with numeral 41. The pump 12 and the control unit 41 form an integral block which includes on its rear side a flange 18 by which the unit is clamped to four horizontal support rods 14, suitable elastic members being interposed between the contol unit flange 18 and the rods 14.

The four support rods have their rear extremities rigidly attached to a centering flange 13 which cooperates with a matching mounting flange 11' of the electric motor 11, across a vertical wall 10. The entire power unit, consisting of the motor 11, of the pump 12, and of the control unit 41, thus forms a compact assembly which is carried by the wall 10. The latter is part of the machine frame of the injection molding machine, serving also as a retaining wall of the hydraulic fluid reservoir. Between the cooperating flange 11' of the motor 11 and flange 13 of the pump carrying support rods 14 and the inner and outer faces of the wall 10, respectively, are clamped two resiliently yielding elastic discs as part of a vibration dampening suspension of the power unit. A preferred version of such a suspension is disclosed in U.S. patent application Ser. No. 567,833, filed Apr. 14, 1975 now U.S. Pat. No. 3,982,856, issued Sept. 28, 1976. The drive shaft of the electric motor 11 and the shaft 15 of the pump 12 are linked together by means of a flexible coupling 16. As the drawing illustrates, the power unit is substantially balanced with respect to its suspension plane on the vertical wall 10, the motor 11 being arranged on the outside of the wall, while the pump and the associated hydraulic control unit are situated on the inside, just above the oil level 27 of the fluid reservoir. Only a suction stub, consisting of a downwardly extending intake line 30 and an intake filter 29, reaches below the fluid level 27.

Figure 3:
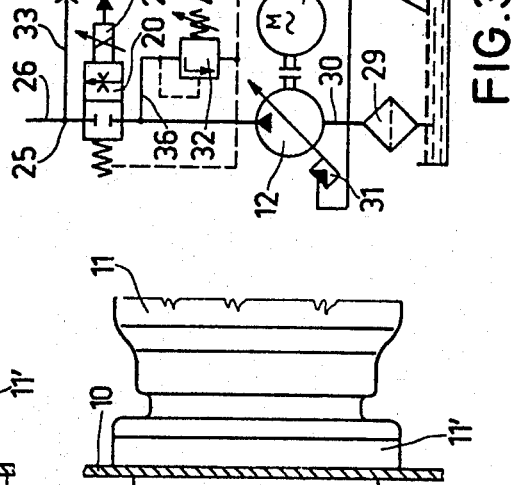
FIG. 3 is a hydraulic circuit diagram depicting the hydraulic control components of the device of FIGS. 1 and 2 and their operational relationships.

The variable delivery pump 12 and the electric motor 11 are also indicated schematically in FIG. 3. The pump may be either an axial piston pump, a radial piston pump, or a radial vane type pump, delivering pressurized fluid into the main supply line 26. In that line is arranged a proportional-response flow control valve 20 with a proportional-force electromagnet 20'. Downstream of the flow control valve 20 is a branch connection 25, where a hydraulic feedback line 33, 34 joins the main supply line 26. In the first line portion 33 is arranged an adjustable control diaphragm 39. The other end of the second line portion 34 leads to the control member 31 of the variable delivery pump 12, readjusting the pump setting for the compensation of leakage and friction losses.

The adjustable control diaphragm 39 of the feedback line 33, 34 has preferabley a circular diaphragm opening which, in the case of a medium-sized injection molding machine with a pump rated at 90 liters per minute, would be adjusted to a diameter of 1 mm, for example. A branch line 35, 37 leads from a point between the control diaphragm 39 and the pump 12 to the fluid reservoir 28. In this branch line is arranged a proportional-response pressure control valve 19 with a proportional-force electromagnet 19' which controls the nominal pressure setting of the variable delivery pump by means of the pump control element 31, being directly connected to the latter via the branch line portion 35 and the feedback line portion 34. The pump control member 31 adjusts the eccentricity of the variable delivery pump 12.

The proportional-force electromagnet 20' of the flow control valve 20 and the proportional-force electromagnet 19' of the pressure control valve 19 are under the influence of electronic feedback loops which monitor and eliminate any deviations of the actual valve position settings from the nominally desired settings. For this purpose, the two electromagnets 19' and 20' have operatively connected to them two position transducers 43 and 44, respectively. These transduces form part of the feedback assemblies 21 and 22, respectively, which receive their electronic input from a program unit (not shown) through plug-type connectors 24 which are shown in FIG. 2. The provision of feedback loops on the proportional-force electromagnets 19' and 20' has the great advantage of automatically compensating for any irregularities which may be due to manufacturing tolerances of the control valves, especially when the latter are not of the highest quality and price class.

As can be seen in FIGS. 1 and 2, the feedback assemblies 21 and 22 are coaxially attached to the proportional-force electromagnets of the control valves 20 and 19, respectively. The two valves 20 and 19 are structurally so arranged that they extend horizontally inwardly from a central body portion 42 of the control unit 41, flanking the latter on both sides. In the central body portion 42, which is integrally attached to the pump housing, are also accommodated the adjustable control diaphragm and a pressure relief valve 32. The main supply line 26 and the hydraulic connecting lines 33, 34, 35, 36, and 40 have the form of internal connecting bores or short rigid connecting lines, thereby giving the control unit 41 a compact rigid configuration which encompasses the control valves with their electromagnets and coaxial feedback assemblies and the variable delivery pump.

Operational tests have demonstrated that, when the hydraulic control circuit of an injection molding machine equipped with programmable proportional-response valves for pressure and flow speed is modified so as to include the proposed feedback line 33, 34 and adjustable control diaphragm 39 for the compensation of leakage and friction losses, and when the proportional-response control valves 20 and 19 are equipped with an electronic feedback loop on their electromagnets 20' and 19' for the verification of the actual valve settings against the nominal setting values, the resultant improvement in response accuracy leads to a substantial reduction in the overall consumption of energy of the hydraulic power unit, so that the variable delivery pump — preferably a radial piston type pump — can be driven with an electric motor of considerably lower power rating. This reduction in total energy consumption, in turn, leads to a correspondingly reduced load on the cooling system. On the other hand, the structural complexity and cost of the improved hydraulic controls are kept to a minimum through the integration of the controls with the variable delivery pump in a compact, comparatively simple assembly. The fact that the majority of connecting lines are bores in the body of the control unit and that the remaining lines are short, rigid connections, positively precludes distortions of the control relationships that might otherwise result from the expansion of the connecting lines under changing pressures. Vibrations of the control components in the control unit, which result from the fact that the latter is structurally integrated with the pump of the elastically suspended hydraulic power unit, are without any detrimental influence on the operational characteristics of the hydraulic controls of the invention.

Last, but not least, the improved hydraulic controls suggested by the present invention lead to better production results, both in product quantity and product quality, by guaranteeing the reliably accurate reproducibility of the quality controlling operational conditions during each machine cycle and by following precisely the predetermined nominal flow values and pressure values of a program which is electronically fed into the hydraulic control circuit. In this context, it does not really matter how many operational phases a particular machine cycle is composed of, as long as the timing of the phases is correct.

It has been found to be advantageous to separately control the generation of the closing pressure on the die closing unit, by using an independent "clamping pump" of low volume and high pressure delivery characteristics. Also, it may be desirable to establish a feedback link between the interior pressure of the die during injection and that part of the hydraulic program which controls the hydraulic cylinder creating the injection pressure on the plastification screw of the injection unit. In general, the various operational phases of a machine cycle, which include the closing motion of the injection molding die, approach motion of the injection cylinder, injection of the plastic material, post-injection pressurization, core removal, part ejection, etc., require a certain amount of overlap in timing, thus establishing a substantially continuous need for pressure fluid to be supplied by the hydraulic power unit.

The proposed novel hydraulic control system further distinguishes itself by its great flexibility and adaptability in the case of setup changes on the injection molding machine, when a change of dies and/or of raw materials is being made, the machine making it possible to quickly set the new speed and pressure parameters by means of an electronic programming unit, or better still, when the program is established on a standardized data carrier which is insertable into the programming unit of the machine to be automatically read by the latter. No special adjustments on any of the hydraulic control components of the invention are necessary, when such a program change takes place.

It should be understood, of course, that the foregoing disclosure describes only a preferred embodiment of the invention, and that it is intended to cover all changes and modifications of this invention which fall within the scope of the appended claims.

I claim the following:

1. In the hydraulic drive system of an injection molding machine, which includes a hydraulic power unit with a variable delivery hydraulic pump driven by an electric motor and controlled by a pump control member, so as to supply variably pressurized hydraulic fluid at variable flow speeds from a fluid reservoir through a main supply line to such units as the die closing unit and the injection unit, in said hydraulic drive system, hydraulic power controls comprising in combination:

a proportional-response flow control valve which is controlled by means of a proportional-force electromagnet and arranged in the main supply line of the variable delivery pump so as to control the flow rate at which pressurized fluid is supplied through said line, in response to an electronic control signal imposed on said electromagnet;
   a branch connection in the main supply line downstream of said flow control valve;
   a hydraulic feedback line leading from the branch connection to the control member of the variable delivey pump, thereby forming a feedback loop for the adjustment of the pump setting in compensation for fluid leakage and friction losses, the feedback line including in it an adjustable control diaphragm;
   a branch line connected to the feedback line at a point between its control diaphragm and the pump control member and leading from there to the fluid reservoir;
   a proportional-response pressure control valve which is controlled by means of a proportional-force electromagnet and arranged in said branch line so as to directly communicate with the pump control member, via the branch line and the hydraulic feedback line, thereby setting the pressure at which fluid is supplied by the pump, in response to an electronic control signal imposed on said electromagnet; and
   electronic feedback means for monitoring and eliminating in each of the two proportional-response control valves any deviations of the actual valve position settings from the nominal valve settings corresponding to the electronic control signals which are fed to the respective proportional-force electromagnets.

2. Hydraulic power controls as defined in claim 1, wherein
   the electronic feedback means associated with the two proportional-response control valves include position transducers which are operatively connected to movable parts of the valves so as to produce electronic signals indicative of the positions of the movable parts; and
   said electronic feedback means, with their position transducers, form feedback assemblies which are structurally connected to the electromagnets of the two control valves in a coaxial relationship.

3. Hydraulic power controls as defined in claim 1, wherein
   the two proportional-response control valves are structurally connected to the housing of the variable delivery pump so as to form a rigid assembly therewith; and
   at least some of the hydraulic connecting lines between the component parts of the hydraulic power controls are provided as bores in a central body portion forming part of said rigid assembly.

4. Hydraulic power controls as defined in claim 3, wherein
   the hydraulic power unit of the injection molding machine includes, in a coaxial, generally horizontally extending assembly: the variable delivery pump, the electric motor, coaxial drive shafts and a shaft coupling between pump and motor, a mounting flange of the motor positioned on the outside of a vertical wall of a box-like machine frame, a similar centering flange associated with the pump on the inside of said wall, and resiliently yielding elastic discs interposed between said flanges and the wall for a vibration dampening suspension of the power unit; and the two proportional-response control valves and the central body portion with its hydraulic connecting lines form a control unit which is arranged on top of the pump housing, the two valves extending horizontally so as to flank the central body portion on both sides.

5. Hydraulic power controls as defined in claim 4, wherein
said vertical wall is a retaining wall of a fluid reservoir whose fluid level is just below the pump, the latter having a downwardly extending intake stub.

6. Hydraulic power controls as defined in claim 4, wherein
the pump and the control unit are rigidly connected to a mounting flange which is spaced axially a distance from said centering flange;
a plurality of support rods are rigidly attached to the centering flange, extending horizontally from the latter to said pump mounting flange; and
the pump mounting flange engages the support rods through the intermediate of elastic members.

7. Hydraulic power controls as defined in claim 6, wherein
the axial spacing of the mounting flange of the pump and control unit from the centering flange is such that the center of gravity of the entire power unit coincides approximately with the position of said vertical wall.

* * * * *